Jan. 10, 1933.     R. M. SHELTON     1,893,753
EXTENSIBLE AUTOMOBILE TRUNK
Filed Aug. 5, 1929     3 Sheets-Sheet 3
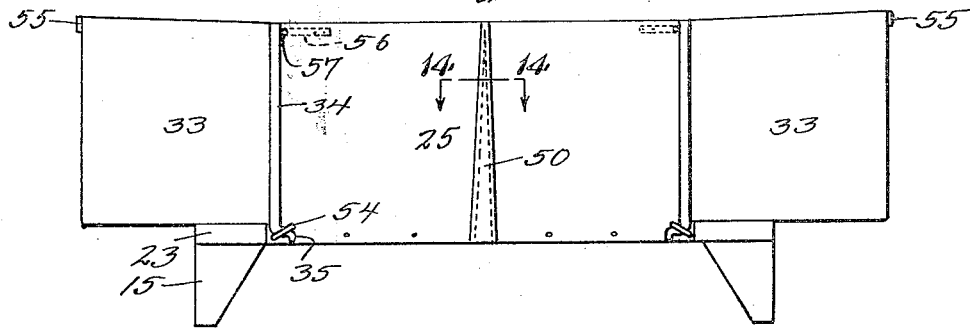
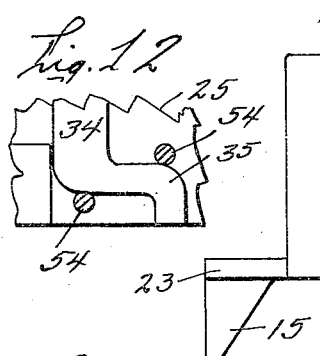
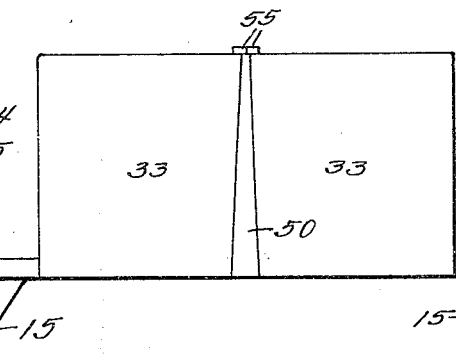
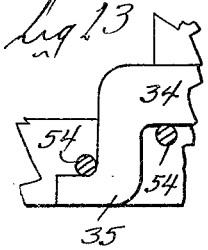
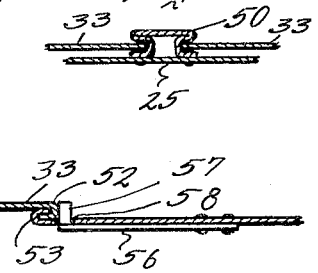
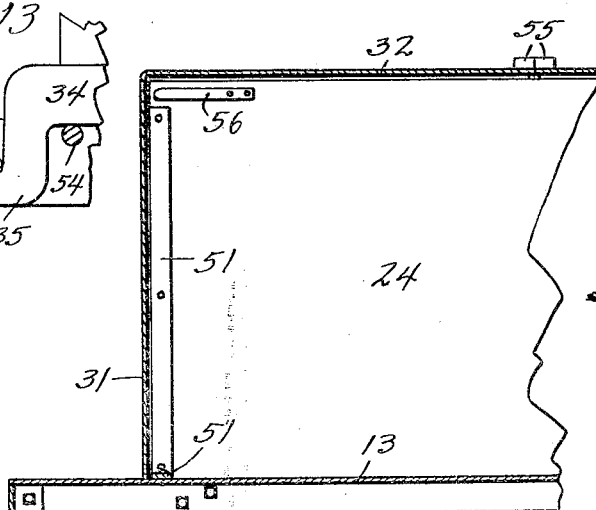

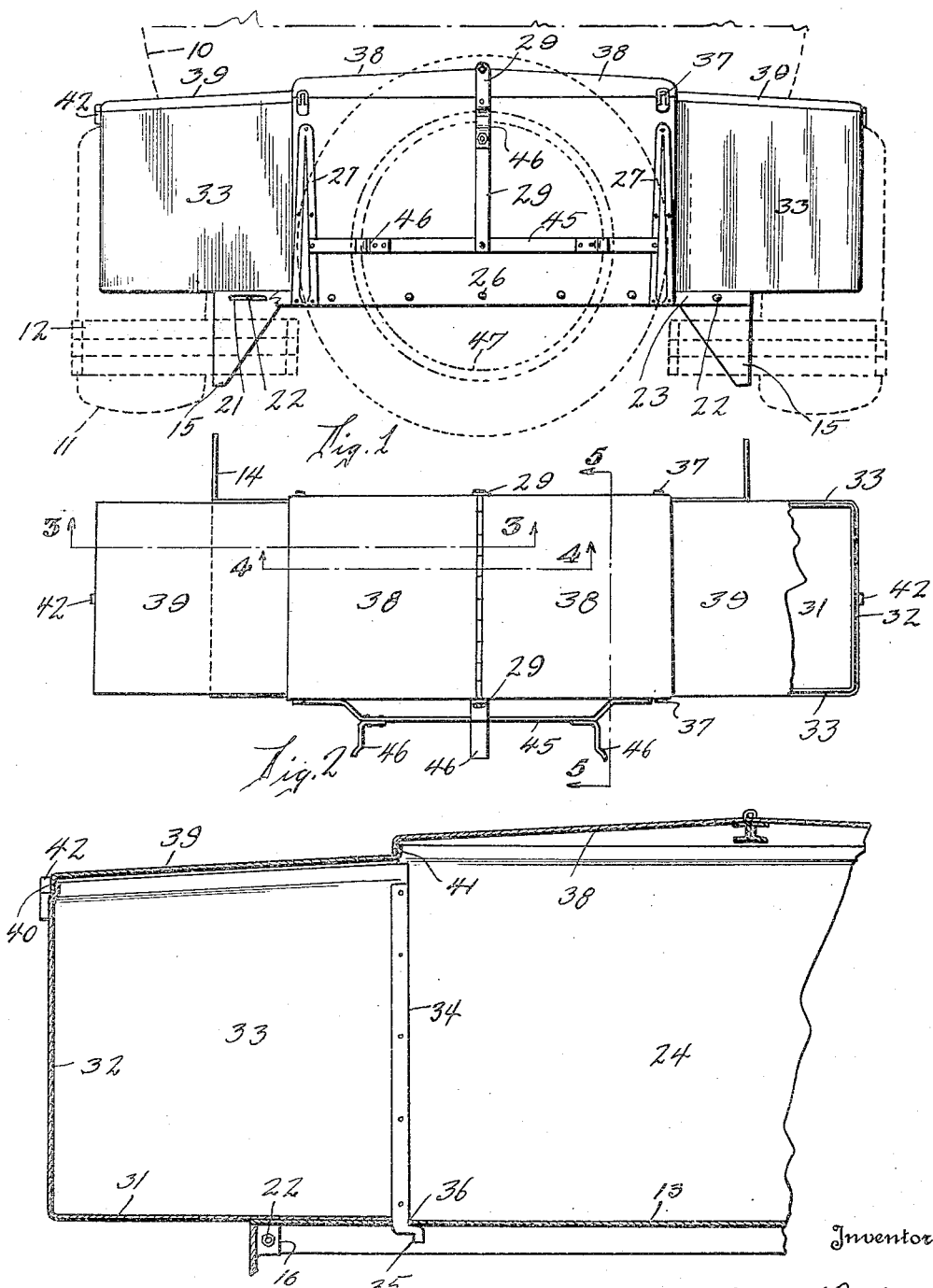

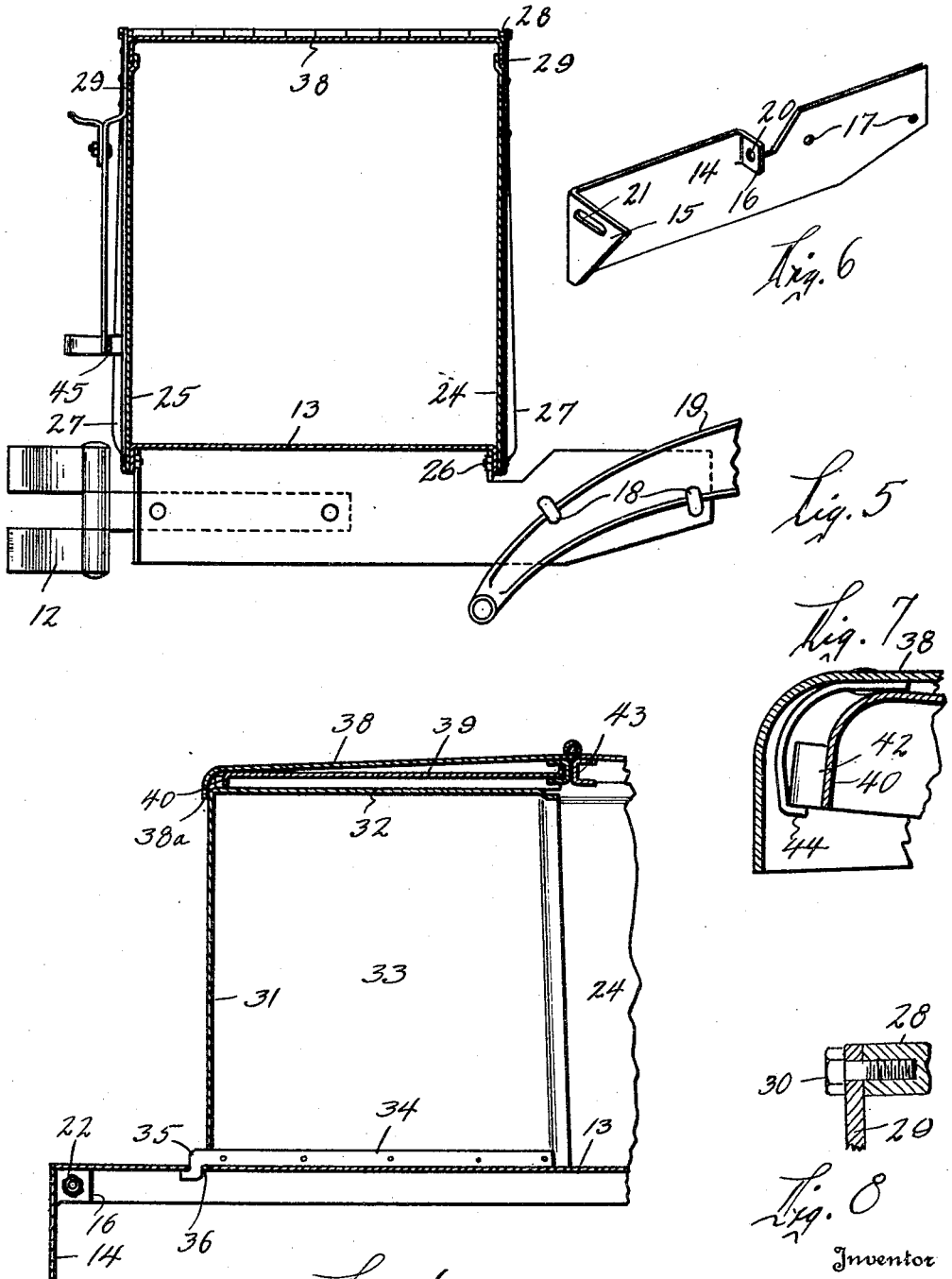

Patented Jan. 10, 1933

1,893,753

UNITED STATES PATENT OFFICE

ROY M. SHELTON, OF SIOUX CITY, IOWA, ASSIGNOR TO JOHN W. MALMQUIST, OF ABERDEEN, SOUTH DAKOTA

EXTENSIBLE AUTOMOBILE TRUNK

Application filed August 5, 1929. Serial No. 383,720.

My invention relates to extensible automobile trunks of the type that is convertible from a closed trunk to an extended receptacle adapted to carry luggage of larger dimensions than can be accommodated by the closed trunk.

An object of my invention is to provide a convertible trunk of this nature which is of simple, durable, and inexpensive construction.

Another object is to provide a trunk on the rear of which a spare tire may be carried, the extensible parts of the trunk being adapted to open in such a direction that the spare tire may be permanently positioned in an upstanding position rearwardly of the trunk, without interfering with the opening or closing of the extensible portion or portions of the trunk.

A further object is to provide a trunk of this character, which is adapted to be extended to provide a luggage carrier of greater length than that of the ordinary extensible trunk now on the market.

The two foregoing objects are both accomplished by employing a fixed trunk member having a rear wall which is permanently positioned upright, having openings at its ends, and by providing a pair of movable trunk members, hinged to the fixed trunk member at its ends and adapted to move laterally to extended positions instead of in a rearward direction, as do the movable trunk members of all present types of extensible trunks.

A further object, one in line with the general object of simplification and strength, is that of constructing the fixed trunk member and trunk platform so that the platform forms the bottom of the trunk, and the two are rigidly united, to give strength to the rear wall of the fixed trunk member, which is necessarily supported almost entirely by its connection with the platform at its lower extremity.

Another object is to provide a construction in which the platform supports the movable trunk members in their extended positions.

A basic object of my invention has been to provide an extensible trunk structure which when extended will carry its load as close to the chassis of the vehicle as when closed. This result obviates one of the objections to the ordinary trunk of this nature, namely, that when extended, the trunk of present construction carries its load much further to the rear than when closed. The result is a necessity for brackets of extraordinarily sturdy construction, and a platform of extra strength. Another objection is the increased length of the vehicle, making it more difficult to move through traffic.

A further object is to provide a trunk of this nature, embodying a hinge construction to connect the fixed and movable trunk members, and especially adapted to carry the load imposed upon it when the trunk is extended and loaded.

With these and other objects in view, my invention consists in the construction, combination, and arrangement of the various parts of my invention, whereby the objects contemplated are attained, as hereinafter more fully set forth, pointed out in my claims, and illustrated in the accompanying drawings, in which:

Fig. 1 is a rear elevation of the trunk, a vehicle to which it is attached being shown in broken lines.

Fig. 2 is a plan view of the trunk.

Fig. 3 is a detail sectional view of the opened trunk taken generally along the lines 3—3 of Fig. 2.

Fig. 4 is a similar view of the closed trunk taken generally along the lines 4—4 of Fig. 2.

Fig. 5 is a transverse sectional view of the trunk taken along the lines 5—5 of Fig. 2.

Fig. 6 is a detail view of the platform bracket.

Fig. 7 is a detail sectional view illustrating the clip for retaining the movable trunk member cover.

Fig. 8 is a detail sectional view illustrating the method of securing the hinge rod to the fixed trunk member walls.

Fig. 9 is a rear elevation of a modified form of trunk.

Fig. 10 is a similar view of the same in closed position.

Fig. 11 is a detail sectional view of the same.

Fig. 12 is a detail view of the hinge in open position.

Fig. 13 is a detail view of the hinge in closed position.

Fig. 14 is a detail sectional view of the weather strip taken approximately along the lines 14—14 of Fig. 9.

Fig. 15 is a detail sectional view of the latch.

In Fig. 1 I have indicated generally by the reference character 10, the body of an automobile to which is attached one of my trunks. The fenders at the rear are shown at 11, and the rear quarter bumpers are indicated at 12. All of these conventional parts are shown in dotted lines.

The trunk platform comprises platform brackets, and a bottom wall 13, secured to the brackets.

The brackets are pressed out of sheet metal, and each comprises a side wall 14, an end wall 15, and an intermediate lug 16, cut and bent from the metal of the wall 14. The brackets may be secured to the rear ends of the chassis rails of a vehicle in any conventional manner, such as is illustrated in Figure 5, in the side wall 14 of which are openings 17 to receive bolts 18 by means of which the bracket is secured to the chassis member of the vehicle. The latter is indicated at 19.

The lug 16 is provided with an opening 20, and the end wall 15 is provided with a slot 21, both to receive bolts 22 to secure the flanges 23 of the bottom 13 to the brackets.

The fixed trunk member comprises the platform 13, and the forward and rear side walls 24 and 25, respectively. The walls 24 and 25 are secured to the flanges 23 of the platform by means of bolts 26. Re-inforcing ribs 27, of channelled construction, as shown, are secured to the walls 24 and 25 near their ends, and brace the walls in rigid upstanding positions.

The walls are tied together at their upper extremities by means of a hinge rod 28, which is secured between the arms 29, extending upwardly from the respective walls 24 and 25. The arms 29 are riveted or spot welded to their respective walls. The rod 28 is secured by means of cap screws 30, (Fig. 8), which are extended through openings in the arms 29 and threaded into the ends of the rod.

It will be noted later that there is no strain of any great consequence imposed upon the side walls, and that the construction just described is sufficiently strong for all purposes for which the trunk may be used.

The movable trunk members each comprise a bottom wall 31, an end wall 32, and side walls 33, secured together to form a semi-box-like structure which is open on two sides. It will also be noted that although the terms "bottom wall" and "end wall" have been used to designate two particular walls, these walls are strictly bottom walls only when the movable trunk member is extended. This method of designating the walls is used for convenience in referring to them.

The movable trunk members are hinged to the platform or to the fixed trunk member near the intersection of the side walls of the fixed trunk member and the platform or bottom of the fixed trunk member. The method of hinging illustrated in the drawings is that of employing two reinforcing ribs 34, secured to the inner sides of the respective side walls 33 of each movable trunk member, and of extending the ribs 34 to form the hooked portion 35, extended through slots 36 in the platform bottom wall 13.

The ribs 34 not only serve as means for hinging the fixed and movable trunk members together, but also as reinforcing elements for the strengthening of the edges of the movable trunk member.

The movable trunk members may be hinged so as to embrace the sides of the fixed trunk member, in which case a different method of hinging would probably be used, or may be designed so as to be received between the side walls of the fixed trunk member, as shown in the drawings. In either case, the movable trunk members are supported by the extended portions of the platform, as shown in Fig. 3, when in their open positions.

It will now be seen that the extension of the movable trunk members does not extend the trunk rearwardly, but instead, utilizes the space on either side of the fixed trunk member and within the limits of the space behind the fenders of the vehicle. There are several advantages resulting from this construction, none of which have been obvious from a contemplation of prior structures. In the first place, by employing two movable trunk members, extensible in opposite directions in line with the longitudinal or largest dimension of the trunk, the space within the extended luggage carrier is made of sufficient length to accommodate long articles such as fence posts, garden tools, and other long-handled implements, and any articles of baggage too long to be received within the present type of luggage carrier.

Secondly, by employing this construction, the weight of the extended trunk is not extended rearwardly of the supporting platform, but is still carried entirely above the platform in a direction longitudinally of the vehicle.

It is true that the movable trunk members are extended beyond the platform, but each one is extended the same distance, and the two when equally loaded will balance each other. Furthermore, by extending the platform substantially halfway under each of the movable trunk members in their extended positions, the latter will be practically balanced on their hinges.

It will be remembered that in the ordinary extensible trunk, the movable trunk member extends rearwardly and beyond the platform, and that when loaded, it will exert considerable leverage upon the platform tending to twist it in one direction. The trunk itself is also thereby subjected to heavy strains not imposed upon the trunk of my invention. Consequently, both platform and trunk of the ordinary construction must be built very heavily. To extend the platform under the extended movable trunk member of the ordinary trunk would be impractical and a very substantial increase in the use of material. It would make it impossible to carry the spare tire on the movable trunk member.

The third advantage resulting from my construction is that of not increasing the length of the vehicle when the trunk is extended. Traffic problems are increased by the rearwardly extended luggage carriers of ordinary construction.

I prefer to embody in my trunk cover constructions for both fixed and movable trunk members. The fixed trunk member covers are ordinary hinged covers, hinged upon the rod 28 and adapted to enclose the upper edges of the walls 24 and 25. A pair of fasteners 37 are employed to secure each cover 38 in closed position.

The movable trunk member covers are not permanently connected to the trunk in any manner. These covers comprise each a cover 39 having flanges 40 adapted to enclose the upper extremities of the walls of a movable trunk member, and an upturned flange 41. When the cover is in the position shown in Fig. 3, the flange 41 is hooked behind the end flange of the cover 38, thus serving to hold the cover 39 against sliding, and holding the inner end of the cover down. The outer end of the cover 39 is held down by a fastener 42.

The cover 39 is held beneath the cover 38 when the trunk is closed, by clips 43 and spring latches 44, (Fig. 7), both secured to the cover 38.

The tire carrier may be of any conventional design, but I prefer to employ one as shown, embodying straps 29, (already mentioned in connection with the hinge rod support) and 45. Clips 46 are secured to the straps 29 and 45 in positions to receive a tire rim 47.

Returning now to the construction of the fixed trunk member, it is noted that the side walls 24 and 25 are attached by means of bolts 26 to the platform. In shipping the trunk, it may be packed in a knock-down condition, since the trunk, as made, can be manufactured at any place and later assembled on the car. By virtue of its various interchangeable parts it can be assembled to the car later. The construction of the platform and trunk is a saving of material, a reduction in the number of parts, and a strengthening of the trunk structure, reducing the number of connections and making a more rigid connection between the fixed trunk member and platform. Rattling of the trunk when the vehicle is in motion is also reduced by this construction.

The fixed trunk member cover 38 is provided with a flange 38a which engages the movable trunk member when the latter is in closed position as shown in Fig. 4, to hold it in that position.

In Figs. 9–15, inclusive, I have illustrated a modified form of trunk embodying my invention. The construction of the platform in this form is identical to that of the other, and the fixed trunk member is the same with the exception that the reinforcing members 27 of the preferred form are omitted, and a combined reinforcing member and weather strip 50 is secured to the outer side of each wall 24 and 25, midway between its ends. A reinforcing rib 51 is secured in each end of the fixed trunk member, and is in the form of an inverted U, bolted to the walls 24 and 25 and bottom 13. (Fig. 11.) The movable trunk members are made large enough to embrace the walls 24 and 25 instead of being received between them as in the preferred form of the invention.

The movable trunk members are identical in construction to those used in the preferred form of the invention, with the exception of the positioning of the hinge straps 34, which, in the modified form, are on the outer sides of the movable trunk member walls, and with the exception of the edges of the walls 33, which are hooked inwardly as shown at 52 in Fig. 15, to mesh with the channelled hooks 53 of the fixed trunk member side walls 24 and 25.

The movable trunk members are hinged to the platform by means of U bolts 54, which are positioned in the angular positions shown, so as to engage the hooked portions 35 in either of the positions shown in Figs. 12 and 13, to rigidly secure the hinge joints against rattling when the movable trunk members are in either open or closed positions.

The movable trunk members are provided with coacting hasps 55, and the edges of the walls 32 are adapted to come together when the movable trunk members are closed, and to be held by said hasps in engagement, as shown in Fig. 11. Thus the walls 32 form the covers for the closed trunk.

The movable trunk members are held in open positions by means of latch devices 56, comprising spring arms riveted to the walls 24 and 25 and provided with pins 57 extended through openings 58 in the walls 24 and 25, and adapted to spring into the path of movement of the walls 33 of the movable trunk members.

The edges of the walls 33 are received in the channels of the weather strips 50 when the movable trunk members are closed, as shown in Fig. 14. The weather strips are decreased in width toward their upper ends, in order to allow the edges of the movable trunk members to come together at the top.

Some changes may be made in the construction and arrangement of the various parts of my invention without departing from the true spirit and purpose thereof, and it is my intention to cover by my claims any modified forms of structure or the use of mechanical equivalents that may be reasonably included within their scope.

I claim as my invention:

1. In an extension trunk, a fixed trunk member including forward and rear side walls and a bottom wall, said fixed trunk member being adapted to be secured to a vehicle in a position therebehind with its ends open and directed laterally, a pair of platform members rigidly secured to the fixed trunk member and extending laterally from the bottom of the fixed trunk member, and a pair of movable trunk members hinged to the fixed trunk member near the lower end corners of the side walls, each of said movable trunk members being adapted to move from an upstanding position forming an end wall in the open end of the fixed trunk member, to a position extended away from said open end in a direction laterally of the vehicle, forming, together with the fixed trunk member, a receptacle of greater length in a direction laterally of the vehicle, than the length of the fixed trunk member.

2. In an extensible trunk, a platform adapted to be secured rigidly to a vehicle in a position extending transversely therebehind, said platform having integral, downwardly bent flanges, a fixed trunk member including a portion of said platform as its bottom wall, and including side walls bolted to said flanges and extending upwardly in planes transversely arranged relative to the vehicle, the platform projecting at each end beyond the fixed trunk member, and a pair of movable trunk members hinged to the fixed trunk member near the lower end corners of the side walls, each of said movable trunk members being adapted to move from an upstanding position forming an end wall in the open end of the fixed trunk member, to a position resting upon an extended portion of the platform, forming, together with the fixed trunk member, a receptacle of greater length in a direction transversely of the vehicle, than the length of the fixed trunk member.

3. In an extensible trunk, a platform adapted to be secured rigidly to a vehicle in a position extending transversely therebehind, a fixed trunk member including a portion of said platform as its bottom wall, and including side walls extending upwardly from the platform in planes transversely arranged relative to the vehicle, the platform projecting at each end beyond the fixed trunk member, and a pair of movable trunk members hinged to the fixed trunk member near the lower end corners of the side walls, each of said movable trunk members being adapted to move from an upstanding position forming an end wall in the open end of the fixed trunk member, to a position resting upon an extended portion of the platform, forming, together with the fixed trunk member, a receptacle of greater length in a direction transversely of the vehicle, than the length of the fixed trunk member.

4. In an extension trunk, a fixed trunk member including forward and rear side walls and a bottom wall, said fixed trunk member being adapted to be secured to a vehicle in a position therebehind with its ends open and directed laterally, a pair of movable trunk members hinged to the fixed trunk member near the lower end corners of the side walls, each of said movable trunk members being adapted to move from a position received between the side walls and forming an end wall in the open end of the fixed trunk member, to a position extended away from said open end in a direction laterally of the vehicle, forming, together with the fixed trunk member, a receptacle of greater length in a direction laterally of the vehicle, than the length of the fixed trunk member, a pair of covers, hingedly together and to the side walls midway between the ends of the fixed trunk member, each of said covers being adapted to cover one half of the fixed trunk member when lowered, and, when raised, to allow swinging movement of a movable trunk member, and fasteners to secure the covers in lowered positions, the covers serving, when so secured, to engage the movable trunk members in their upstanding positions and to secure them against extension.

5. In an extension trunk, a fixed trunk member including forward and rear side walls and a bottom wall, said fixed trunk member being adapted to be secured to a vehicle in a position therebehind with its ends open and directed laterally, a pair of movable trunk members, hinged to the fixed trunk member near the lower end corners of the side walls, each of said movable trunk members being adapted to move from a position forming an end wall in the open end of the fixed trunk member, to a position extended away from the fixed trunk member in a direction transversely of the vehicle, forming, together with the fixed trunk member, a receptacle of greater length in a direction transversely of the vehicle, than the length of the fixed trunk member, and a pair of covers, hinged together and to the side walls midway between the ends of the fixed trunk member, said cover hinge serving as a brace connecting the side walls, each of said covers being adapted to cover one half of the fixed trunk member.

6. In an extension trunk, a fixed trunk member including forward and rear side walls and a bottom wall, said fixed trunk member being adapted to be secured to a vehicle in a position therebehind with its ends open and directed laterally, a pair of platform members rigidly secured to the fixed trunk member and extending laterally from the bottom thereof, and a pair of movable trunk members mounted for extension relative to the fixed trunk member, from positions forming end walls in the open ends of the fixed trunk member, to positions extended away from said open ends, forming, together with the fixed trunk member, a receptacle of greater length than the length of the fixed trunk member in a direction laterally of the vehicle, the movable trunk members being supported in extended positions by said extended platform members.

7. In an extension trunk, a fixed trunk member including forward and rear side walls and a bottom wall, said fixed trunk member being adapted to be secured to a vehicle in a position therebehind with its ends open and directed laterally, a pair of movable trunk members hinged to the fixed trunk member near the lower end corners of the side walls and adapted to swing in a direction laterally of the vehicle, from upstanding positions forming endwalls and a cover for, and enclosing the fixed trunk member, to positions extended laterally from said open ends, forming, together with the fixed trunk member, a receptacle of greater length than the fixed trunk member, the edges of said movable trunk members being adapted to engage each other when the trunk is closed, and hasps on the movable trunk members, adjacent said edges, adapted to coact to secure the movable trunk members together.

8. In an extensible trunk, a fixed trunk member including forward and rear side walls and a bottom wall, said fixed trunk member being adapted to be secured to a vehicle in a position therebehind with its ends open and directed laterally, a pair of movable trunk members hinged to the fixed trunk member near the lower end corners of the side walls and adapted to swing from positions enclosing the fixed trunk member and forming end walls and a cover therefor, to positions extended laterally from said open ends, forming, together with said fixed trunk member, a receptacle of greater length than the fixed trunk member, and a weather strip having channels to receive the edges of the movable trunk member side walls, said weather strip being positioned vertically midway of the ends of the fixed trunk member, and secured to the outer side of a side wall of the fixed trunk member.

9. In an extensible trunk, a fixed trunk member including forward and rear side walls and a bottom wall, said fixed trunk member being adapted to be secured to a vehicle in a position therebehind with its ends open and directed laterally, a pair of movable trunk members hinged to the fixed trunk member near the lower end corners of the side walls and adapted to swing from positions enclosing the fixed trunk member and forming end walls and a cover therefor, to positions extended laterally from said open ends, forming, together with said fixed trunk member, a receptacle of greater length than the fixed trunk member, and spring latch devices secured to the side walls on the inner sides thereof and provided with portions extended through the side walls and adapted to extend into the paths of closing movement of edges of the movable trunk members.

10. In an extension trunk, a fixed trunk member having a bottom and side walls, a movable trunk member including bottom, end, and side walls, said movable trunk member being hinged to the fixed trunk member near the lower end corners of the fixed trunk member side walls, and being adapted to swing from an upstanding position forming an end wall for the fixed trunk member, to an extended position forming continuations of the bottom and side walls of the fixed trunk member, a cover hinged to the fixed trunk member and provided with a downwardly extending flange, a movable trunk member cover provided with a downwardly extended flange on three sides to embrace the upper extremities of the side and end walls of the movable trunk member, coacting fasteners on the movable trunk member cover and the end wall of the movable trunk member, and an upwardly extending flange on the fourth side of the movable trunk member cover, adapted to engage the inner side of the end flange of the fixed trunk member cover.

11. In an extension trunk, a fixed trunk member including forward and rear side walls and a bottom wall, said fixed trunk member being adapted to be secured to a vehicle in a position there behind with its ends open and directed laterally, and a pair of movable trunk members hinged to the fixed trunk member near the lower end corners of said side walls, each of said movable trunk members being adapted to move from a position received between the side walls and forming an end wall in the open end of the fixed trunk member, to a position extended away from said open end in a direction laterally of the vehicle, forming, together with the fixed trunk member, a receptacle of greater length, in a direction laterally of the vehicle, than the length of the fixed trunk member.

12. In an extension trunk, a fixed trunk member including forward and rear side walls and a bottom wall, said fixed trunk member being adapted to be secured to a vehicle in a position there behind with its ends open and directed laterally, and a pair of movable trunk members hinged to the fixed trunk member near the lower end corners of said side walls, each of said movable trunk members being adapted to move from a position received between the side walls and forming an end wall in the open end of the fixed trunk member, to a position extended away from said open end in a direction laterally of the vehicle, forming, together with the fixed trunk member, a receptacle of greater length, in a direction laterally of the vehicle, than the length of the fixed trunk member, and a spare tire carrier secured to and carried by the rear side wall of the fixed trunk member.

Signed at Sioux City, Iowa, this 18th day of July, 1929.

ROY M. SHELTON.